United States Patent
Liu et al.

(10) Patent No.: US 11,340,195 B2
(45) Date of Patent: May 24, 2022

(54) METHODS AND SYSTEMS FOR PIPE WALL THICKNESS DETECTION

(71) Applicant: Zhejiang Future Technology Institute (jiaxing), Jiaxing (CN)

(72) Inventors: Shuangwen Liu, Jiaxing (CN); Lei Liu, San Ramon, CA (US)

(*) Notice: Subject to any disclaimer, the term of this patent is extended or adjusted under 35 U.S.C. 154(b) by 128 days.

(21) Appl. No.: 16/572,598

(22) Filed: Sep. 17, 2019

(65) Prior Publication Data
US 2020/0300812 A1  Sep. 24, 2020

(51) Int. Cl.
| | |
|---|---|
| *G01N 29/04* | (2006.01) |
| *G01N 29/22* | (2006.01) |
| *G01N 29/24* | (2006.01) |
| *G01N 29/28* | (2006.01) |
| *G01K 13/00* | (2021.01) |
| *G01N 29/12* | (2006.01) |
| *G01B 17/02* | (2006.01) |
| *G01N 17/04* | (2006.01) |
| *G01N 29/07* | (2006.01) |

(52) U.S. Cl.
CPC ........... *G01N 29/043* (2013.01); *G01B 17/02* (2013.01); *G01K 13/00* (2013.01); *G01N 17/04* (2013.01); *G01N 29/07* (2013.01); *G01N 29/12* (2013.01); *G01N 29/223* (2013.01); *G01N 29/228* (2013.01); *G01N 29/2437* (2013.01); *G01N 29/2462* (2013.01); *G01N 29/28* (2013.01); *G01N 2291/011* (2013.01); *G01N 2291/023* (2013.01); *G01N 2291/02854* (2013.01); *G01N 2291/102* (2013.01); *G01N 2291/2698* (2013.01)

(58) Field of Classification Search
CPC .. G01N 29/043; G01N 29/223; G01N 29/228; G01N 29/2437; G01N 29/2462; G01N 29/28; G01N 29/12; G01N 29/07; G01N 2291/2698; G01K 1/143
USPC .......................................................... 73/592
See application file for complete search history.

(56) References Cited

U.S. PATENT DOCUMENTS

4,487,071 A * 12/1984 Pagano ................... G01N 29/07
                                                        73/612
6,047,602 A *  4/2000 Lynnworth ............. G01F 1/662
                                                        73/632
(Continued)

*Primary Examiner* — Tarun Sinha
(74) *Attorney, Agent, or Firm* — Jigang Jin (57) ABSTRACT

The present invention discloses ultrasonic nondestructive methods for pipe wall thickness measurement at high or low temperatures. An ultrasonic detection device comprises a first and a second ultrasonic waveguide. The waveguide length is selected according to the surface temperature of a pipe under inspection. A first piezoelectric plate causes generation of a plurality of ultrasonic excitation signals which is transmitted to the pipe through the first ultrasonic waveguide. The plurality of ultrasonic excitation signals has different group speeds when traveling along the first ultrasonic waveguide. The reflected ultrasonic wave signals are collected and transmitted to a second piezoelectric plate by the second ultrasonic waveguide. The pipe wall thickness is calculated using an ultrasonic wave signal which has the highest group speed. The first and second waveguides are arranged parallel and side by side. An isolation plate is disposed such that the first and second waveguides go through the plate perpendicularly.

16 Claims, 7 Drawing Sheets

(56) References Cited

U.S. PATENT DOCUMENTS

| | | | |
|---|---|---|---|
| 2003/0172743 A1* | 9/2003 | Ao | G01F 1/662 |
| | | | 73/861.27 |
| 2012/0103097 A1* | 5/2012 | Lopez Jauregui | G01N 29/2412 |
| | | | 73/643 |
| 2013/0343424 A1* | 12/2013 | Zombo | G01N 29/0672 |
| | | | 374/117 |
| 2016/0033453 A1* | 2/2016 | Cegla | G01N 29/343 |
| | | | 73/602 |
| 2016/0320219 A1* | 11/2016 | Hellevang | G01F 1/667 |
| 2019/0195830 A1* | 6/2019 | Tamura | G01B 17/02 |

* cited by examiner

METHODS AND SYSTEMS FOR PIPE WALL THICKNESS DETECTION

CROSS-REFERENCE TO RELATED APPLICATION

This application claims priority to Chinese Patent Application No. 201910218226.1 filed on Mar. 21, 2019, the entire content of which is incorporated by reference herein.

FIELD OF INVENTION

This invention generally relates to ultrasonic nondestructive detection and specifically to ultrasonic nondestructive detection of pipe wall thickness.

BACKGROUND OF THE INVENTION

Corrosion of pipework is one of the most widespread and costly problems in the petro-chemical, oil, gas, and power industries. Wall-thickness loss due to corrosion along time may cause pipework leakage and pose substantial safety, property, and environmental risks. When the temperature of pipework is elevated, such as in a refining plant, the corrosion damage is exacerbated. Therefore, it is often required to examine pipe wall thickness regularly.

Ultrasonic nondestructive detection is frequently used in pipework inspection. For applications at high or low temperatures, the detection device usually includes a thin and long ultrasonic waveguide, through which ultrasonic Lamb waves are transmitted. The thin and long waveguide attenuates signal intensity, generates distortion of the waveform, produces unwanted clutter, and complicates data processing and high-resolution wall-thickness measurement. In addition, in order to transmit single-mode ultrasonic Lamb waves along a thin and long waveguide, strict restrictions on the waveguide dimensions are imposed. Moreover, Lamb waves traveling inside a thin and long waveguide are sensitive and susceptible to environmental changes. For instance, rainwater or oil stains on the surface of a waveguide may interfere with the propagation of Lamb waves. Thus, certain isolation measures are needed when inspections are conducted in an oil refinery or power plant.

Therefore, there exists a need for an improved ultrasonic detection method and device for evaluating pipework and measuring pipe wall thickness.

SUMMARY OF THE INVENTION

The present invention discloses methods, devices, and systems for ultrasonic pipe wall thickness measurement. The ultrasonic devices and systems can monitor the wall loss of pipework at high temperatures or low temperatures continuously or by schedule.

An ultrasonic detection device may include at least one ultrasonic transducer, at least one ultrasonic sensor, at least two ultrasonic waveguides, and a measuring unit. The two waveguides are disposed side by side and isolated from each other. The length of the waveguides accommodates the surface temperature of a pipe under inspection. The length is chosen such that the transducer, sensor, and measuring unit are away from the pipe by a certain distance so that the environmental temperature is within their normal working range. The ultrasonic transducer excites ultrasonic wave signals in an ultrasonic waveguide. The ultrasonic wave signals travel along the ultrasonic waveguide to the pipe and are reflected by the pipe at the pipe's outer surface and inner surface. The reflected ultrasonic wave signals by the inner surface enter another ultrasonic waveguide and travel through the waveguide to the sensor. The sensor receives the reflected ultrasonic wave signals, converts the ultrasonic wave signals to electric signals, and feeds the electric signals to the measuring unit. An ultrasonic wave signal that has the highest group speed in the waveguides is used to calculate the pipe wall thickness. The pipe wall thickness may be determined using the travel time of the ultrasonic wave signal having the highest group speed, the length of the waveguides, the distance between centers of the waveguides, and the speeds of ultrasonic waves in the waveguides, the pipe wall, and the coupling metal sheet.

Optionally, the ultrasonic waveguides may be an elongated bar including a right circular cylinder, a semicircular cylinder, an oval cylinder, or a square column.

Optionally, the ultrasonic waveguides may be right circular cylinders with a diameter of 4-16 millimeters.

Optionally, the ultrasonic waveguides may be made of materials which are conductive to ultrasound and can withstand high temperatures or low temperatures.

Optionally, an object under inspection may also be a container, a metal plate, a storage tank, etc.

Optionally, the ultrasonic detection device may include a temperature sensor which may be used to measure or estimate the surface temperature of the pipe under inspection.

Optionally, temperature compensation may be used to adjust measurement results of pipe wall thickness.

Optionally, the ultrasonic waveguides may be mounted on the pipe and the waveguide ends have direct contact with the pipe's outer surface.

Optionally, the ultrasonic waveguides may be mounted on the pipe and a gold sheet, a silver sheet, a copper sheet, or an aluminum sheet may be inserted between the waveguide ends and the pipe's outer surface to improve coupling efficiency of ultrasound.

Optionally, the device may include an isolation plate to help isolate the transducer, sensor, and measuring unit from the high or low temperature at the pipe.

Optionally, the measuring unit may communicate with a remote center through a network. The measuring unit may receive commands from the center, perform the tasks required by the commands, and transmit inspection data and results to the center.

Optionally, the measuring unit may conduct detection on pipe wall thickness continuously, periodically, or by schedule.

The present invention has the following merits: It is relatively convenient to mount or dismount the ultrasonic detection device on a pipe under inspection. The structural integrity of the pipe is preserved. It avoids potential safety risks in the future. The process is relatively simple when attaching a piezoelectric actuator to an end of a waveguide. In addition, propagation of ultrasonic waves in the waveguides is not subject to environmental changes. The detection result is consistent and reliable. It doesn't need expensive high-temperature couplant or high-temperature probes. The isolation plate effectively shields the transducer, sensor, and measuring unit from a high-temperature pipe. Thus, regular components such as regular piezoelectric plates may be used to inspect a pipe at high temperatures. Pipe wall thickness inspection may be conducted continuously, periodically, or by schedule and performed online or offline. Inspection results may be obtained in real time. Therefore, wall loss associated with corrosion may be monitored effectively to prevent fatal accidents from happening.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIGS. 1-A and 1-B illustrate exemplarily a perspective and a cross-sectional view of an ultrasonic detection device, according to one embodiment of the present invention.

DETAILED DESCRIPTION

Detailed description of the present invention is provided below along with figures and embodiments, which further clarifies the objectives, technical solutions, and advantages of the present invention. It is noted that schematic embodiments discussed herein are merely for illustrating the invention. The present invention is not limited to the embodiments disclosed.

Figure 1:
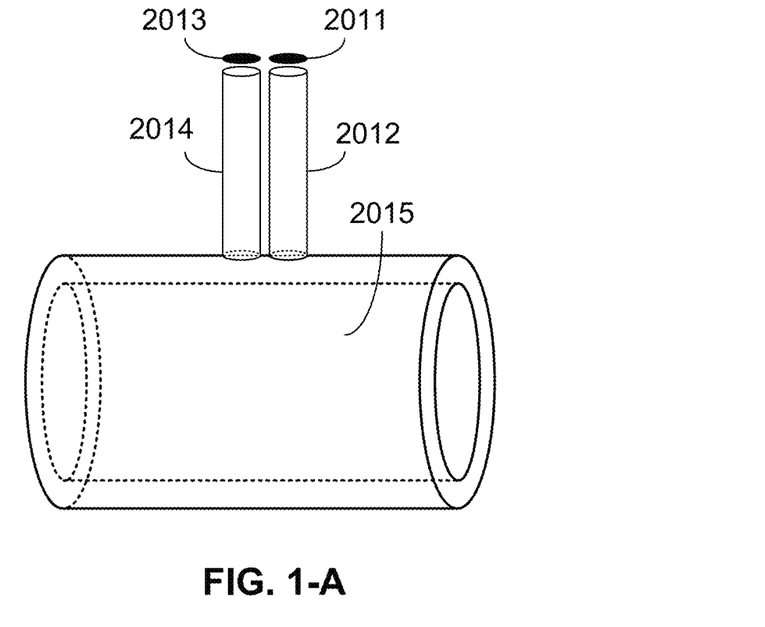

FIG. 1-A exemplarily illustrates a perspective view of an ultrasonic detection device, according to one embodiment of the present invention. The detection device comprises two ultrasonic waveguides 2012 and 2014 and two ultrasonic transducers 2011 and 2013. The waveguides may be elongated objects including right circular cylinders, semicircular cylinders, oval cylinders, square columns, rectangular strips, and so on. Ultrasonic transducers may be employed as an actuator to excite an ultrasonic wave signal or as a sensor to detect an ultrasonic wave signal.

Ultrasonic transducers may include piezoelectric transducers or Electromagnetic Acoustic Transducers (EMAT). Based on the piezoelectric property of a material, piezoelectric transducers convert electrical energy directly into mechanical energy or vice versa. Based on the magnetostrictive property of a material, EMAT convert the energy in a magnetic field into mechanical energy or vice versa. A piezoelectric transducer may have a piezoelectric ceramic plate disposed between two electrodes. EMAT may contain a coil of wire which is wrapped around a magnetostrictive material. For embodiments here and below, piezoelectric transducers are used. The piezoelectric transducers may be replaced by EMAT in certain cases, which also means change of waveguide materials. Additionally, as used herein, piezoelectric plates are often used to represent piezoelectric transducers for simplicity reasons. In addition, piezoelectric plates may be called piezo plates.

In one embodiment, waveguides 2012 and 2014 are two identical right circular cylinders. Two ultrasonic transducers, represented by piezoelectric plates 2011 and 2013, are placed at the sensor ends of the waveguides. The waveguides are parallel, side-by-side, and spaced apart by a given short distance. Plates 2011 and 2013, sandwiched between electrodes (not shown), may be attached to the sensor ends of the waveguide directly. The detection ends of the waveguides, which face a pipe 2015, may be placed against the pipe's outer surface perpendicularly.

The diameter of the right cylindrical waveguides may be between 4 to 16 millimeters. The waveguide material is conductive to ultrasonic waves and can sustain certain high temperatures or low temperatures. A material, which the pipe is made of, may also be used to construct waveguides if the material fits given requirements. Besides pipework, the ultrasonic detection device may also be used to inspect a container, a metal plate, a storage tank, etc.

FIG. 1-B depicts a schematic cross-sectional view of the detection device discussed above. As mentioned, piezoelectric plates 2011 and 2013 are attached to the sensor ends of waveguides 2012 and 2014 respectively. The piezo plates and end surfaces of the waveguide are parallel. Outer surfaces of the piezo plate assemblies may be in direct contact with the end surfaces, i.e., without a gap between them. Plate 2013 may be actuated to excite an ultrasonic wave signal at time T1. The signal is coupled into waveguide 2014 and travels along a path 2016 inside it. The ultrasonic wave signal exits the waveguide at the detection end which faces pipe 2015. Then part of the signal is reflected by an outer surface 2018 of the pipe and part of it is transmitted into the pipe wall. A first portion of the signal, which is reflected by the outer surface 2018, enters the waveguide 2014. A second portion of the signal is transmitted through outer surface 2018, reflected by an inner surface 2019 of the pipe, and enters waveguide 2012. The second portion of the signal travels along a path 2017 inside waveguide 2012 and is detected by piezoelectric plate 2011 at time T2.

The second portion of the signal is used to calculate the pipe wall thickness of pipe 2015, i.e., the perpendicular distance between surfaces 2018 and 2019. For the second portion of the signal, the total traveling time is a time period between time T1 and time T2.

Assuming that t1 is the time the second portion of the signal travels along paths 2016 and 2017 inside the waveguides, t2 is the time it travels in the pipe wall, and t3 is the time it travels from the detection end of waveguide 2014 to the outer surface 2018 plus the time from the outer surface 2018 to the detection end of waveguide 2012 (if the waveguide is not in direct contact with the pipe, e.g., it is coupled with the pipe via a metal sheet), the total traveling time is the sum of t1, t2, and t3. Time t1 is determined by the length of path 2016 plus the length of path 2017 and the speed of ultrasonic waves in the waveguides. If the plates 2013 and 2011 are in direct contact with the sensor ends of the waveguides respectively, the length of path 2016 and the length of path 2017 would be equal to the lengths of the waveguides respectively. Time t3 is determined by the distance D1 (i.e., the thickness of the coupling metal sheet) between the waveguide's detection ends and pipe's outer surface and the speed of ultrasonic waves in the coupling metal sheet.

In case the waveguides' detection ends are in direct contact with the outer surface of the pipe, t3 should be zero. Time t2 is determined by the length L of a traveling path in the pipe wall and the speed of ultrasonic waves in the pipe wall. Length L is determined by a distance D2 between centers of waveguides 2012 and 2014 and the pipe wall thickness.

Assuming that the speeds of ultrasonic waves in the waveguide, in the coupling metal sheet, and in the pipe wall are known, and assuming that length of the waveguides and distance D1 are also known, time t1 and t3 may be calculated. Thus, once the total traveling time is measured, time t2 is obtained by deducting t1 and t3. After t2 is known, length L is calculated by multiplying t2 by the speed of ultrasonic waves in the pipe wall. Then, the pipe wall thickness may be calculated using length L and distance D2.

In one embodiment, a lookup table may be used to determine a pipe's wall thickness. The lookup table takes waveguide length, distance between the waveguides, total traveling time as inputs (assuming the waveguides' detection ends are in direct contact with the pipe and the waveguides' sensor ends are in direct contact with the plates) and outputs the pipe's wall thickness. Such a lookup table may be constructed by conducting detections in a lab environment by using waveguides with different lengths and in-between distances and pipes having known wall thickness. In certain situations, temperatures may also be introduced as an input factor in constructing such a lookup table.

Waveguides 2012 and 2014 are right circular cylinders. When the cylinders have a given diameter, such as a value between 4 to 16 millimeters, plate 2013 may cause generation of multiple guided wave modes in waveguide 2014 after exciting an ultrasonic wave signal. The guided wave modes are configured in the waveguide and propagate or travel along the waveguide at different group speeds. The guided wave modes may be considered as different ultrasonic wave signals. As discussed above, after exiting waveguide 2014, a part of the ultrasonic wave signals is reflected by inner surface 2019 and a part of the reflected ultrasonic wave signals is received by waveguide 2012. Next, multiple guided wave modes are formed in waveguide 2012. The guided wave modes propagate or travel along waveguide 2012 at different group speeds and may be considered as different ultrasonic reflection signals.

When the difference between the highest group speed and the second highest group speed is larger than a given value, the wave mode or the ultrasonic wave signal which has the highest group speed may be used for pipe wall thickness detection. The group speed is the speed used to calculate pipe wall thickness in discussions above. If mode m1 has the highest group speed among the ultrasonic wave signals and mode m2 has the highest group speed among the ultrasonic reflection signals, the group speeds of modes m1 and m2 are the same since waveguides 2012 and 2014 are identical. When an ultrasonic wave signal travels from plate 2013 to plate 2011 through the waveguides and the pipe wall at the highest group speed, it means that the signal propagates in m1 mode in waveguide 2014 and propagates in m2 mode in waveguide 2012.

Optionally, the detection device may include one or more temperature sensors for measuring the surface temperature of pipe 2015. In addition, since the piezoelectric plates and the device's measuring unit can't withstand high temperatures, selected lengths of waveguides 2012 and 2014 are used. For instance, the waveguide length may be determined such that the piezo plates and measuring unit are at a safe distance away from pipe 2015 when the pipe's temperature is high or low. In practice, certain lengths of waveguides may be prepared to match certain ranges of surface temperatures for optimized detection results.

Waveguides 2012 and 2014 may be mounted on pipe 2015 directly. For instance, the detection ends of the waveguides may be in direct contact with the pipe's outer surface, while the waveguides stand on the pipe perpendicularly. As the pipe surface is not flat, metal sheets may be inserted between the detection ends and the outer surface. It improves the coupling efficiency of ultrasonic waves when a signal is transmitted into the pipe wall from waveguide 2014 or picked up by waveguide 2012. The metal sheets may include a gold sheet, a silver sheet, a copper sheet, or an aluminum sheet.

A measuring unit of the detection device may be connected with a remote server or remote center through a network. The measuring unit may receive commands, perform the tasks required by the commands, and transfer data and inspection results to the center in real time or by schedule.

Optionally, the detection device may include one or more additional waveguides and one or more additional piezoelectric plates. For instance, another set of waveguide and piezo plate assembly may be disposed on the left side of waveguide 2014, i.e., the opposite to the left side of waveguide 2014. The additional components may be used to collect reflected ultrasonic wave signals and provide more data sets. It may improve detection of pipe wall thickness. In addition, the detection device may comprise multiple detection units, where each detection unit may have the same structure as the embodiment shown in FIGS. 1-A and 1-B, i.e., containing two waveguides for sending and receiving signals and two piezo plates for exciting and sensing signals. Thus, pipe wall thickness may be measured at multiple places on a pipe simultaneously.

Figure 2:
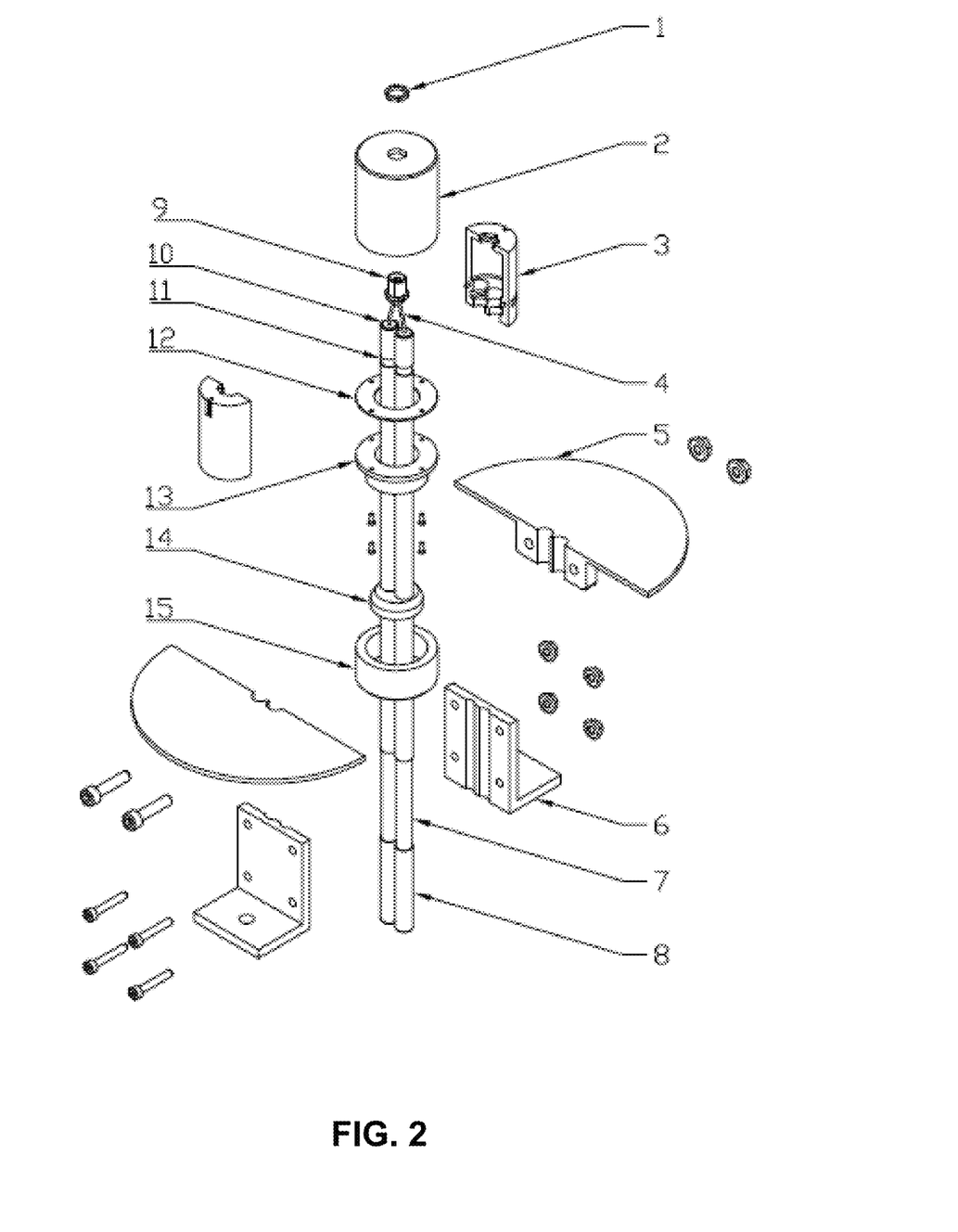
FIG. 2 illustrates exemplarily an exploded view of an ultrasonic detection device, according to one embodiment of the present invention.

FIG. 2 illustrates schematically an exploded view of an ultrasonic detection device, according to one embodiment of the present invention. The exploded view reflects an exemplary assembly structure. It includes two ultrasonic waveguides 8 and two piezoelectric plates 10. The waveguides are parallel, side by side, and separated by a given distance. They have matching recess areas 7 and 11 on the waveguide surfaces. The recess areas are made by machining and used for aligning and fastening the waveguides. The detection ends or lower ends of the waveguides face a pipe (not shown) under inspection. The sensor ends or upper ends of the waveguides, where piezo plates 10 are attached, have a protective housing which includes housing parts 2, 13, and 15. Inside the house, there are holders 3 for fixing the waveguides. Holders 3 have notches which match the shape of the waveguides. The protective housing also includes a nut 1, a connector 9, a sealing washer 12, and a rubber gasket 14. Connector 9, sealing washer 12, and rubber gasket 14 are designed to prevent water and dust from entering the housing. A pair of wires 4 are electrically connected to piezo plates 10 respectively.

The device also has an isolation plate 5 which consists of two half-round halves. Isolation plate 5 may be made of a metal material or a material which can withstand high or low temperature and has high thermal conductivity. The plate is employed to shield piezo plates 10 and other components vulnerable to high or low temperatures. For instance, it blocks thermal radiation from a high-temperature pipe and stops hot air convection when the pipe is below it. Isolation plate 5 also works as a heat sink for the waveguides.

A pair of L-shaped fixtures 6 are made to hold the waveguides together along with holders 3. The L-shaped fixtures clasp the waveguides via recess areas 7. The hole on the base plate of fixture 6 is used for fastening the detection device on a pipe.

As aforementioned, waveguides 8 may have different shapes. When they are right circular cylinders, the minimum and maximum diameters may be 4 and 16 millimeters respectively. And the minimum and maximum lengths may be 50 and 1000 millimeters respectively. For waveguides of right circular cylinders, the piezo plates may have a circular shape with a matching diameter. Excitation frequency of the piezo plates may be between 1 to 10 MHz.

The detection device may also include a temperature sensor which may be installed, for instance, on a waveguide section inside the protective housing. After temperature data is obtained, the surface temperature of a pipe under inspection may be estimated by calculation. Then the wall thickness results may be calibrated through temperature compensation accordingly.

At the beginning of a wall thickness inspection, a pipe's surface temperature has to be known. Based on the surface temperature, a matching length of waveguides is selected. High temperatures require relatively long waveguides. For instance, if the surface temperature reaches 600 degrees Celsius, the length of waveguides may be longer than 300 millimeters. After selecting the waveguide length, a pair of waveguides may be retrieved. Then the detection device may be mounted on the pipe. Next, similar to discussion above, an ultrasonic wave signal may be excited and transmitted to the pipe. The reflected signals are collected and ascertained. Finally, the measurement data is processed to calculate the pipe wall thickness.

Figure 3:
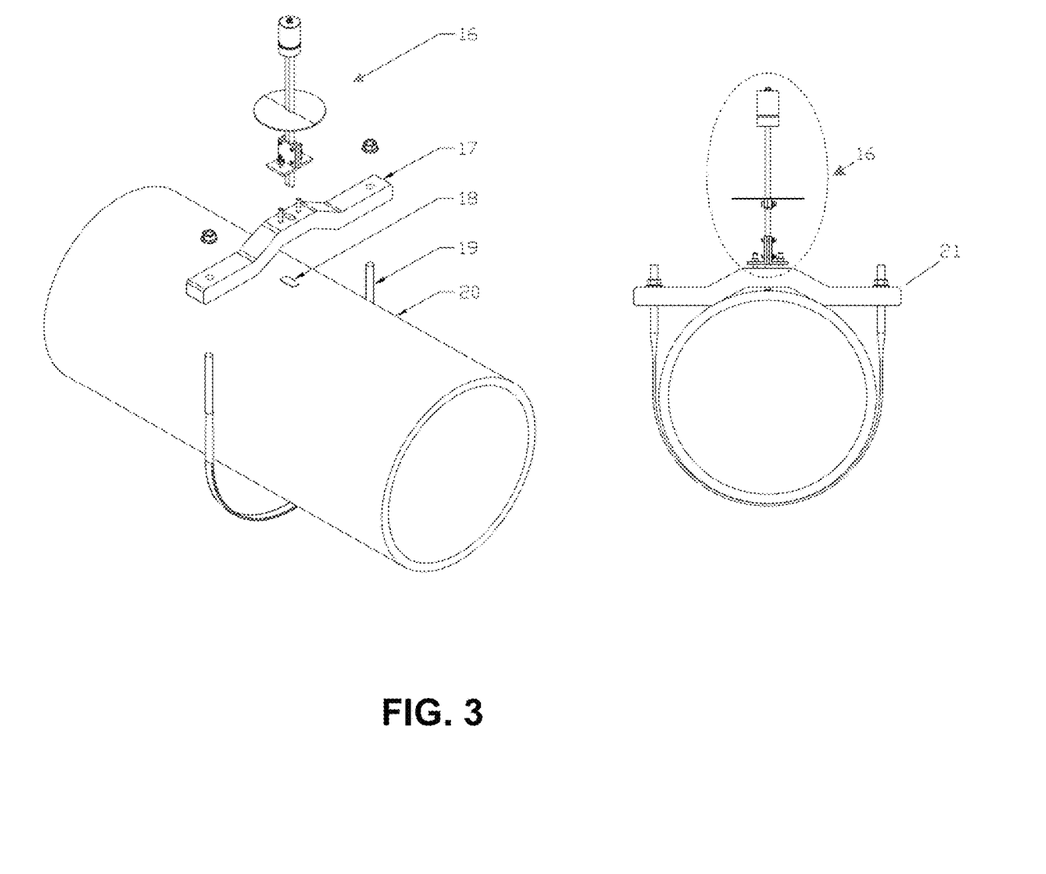
FIG. 3 illustrates exemplarily an exploded and a cross-sectional view of an ultrasonic detection device which is clamped to a pipe, according to one embodiment of the present invention.

FIG. 3 shows schematically an exploded and a cross-sectional view of an ultrasonic detection device 16 which is mounted on a pipe 20, according to one embodiment of the present invention. In the cross-sectional view, a structure encircled by a dotted oval line represents detection device 16. Device 16 may have the same configuration as the embodiment shown in FIG. 2. A mounting structure 21 contains a bar 17 and a U-strap clamp 19. Bar 17 is fixed on pipe 20 via clamp 19. Device 16 is mounted on bar 17 by bolts and the L-shaped fixtures. Metal sheet 18 is used to enhance the coupling efficiency of ultrasonic waves when the waves are transmitted into and received from pipe 20. The thickness of sheet 18 may be, for instance, smaller than 0.4 mm.

Figure 4:
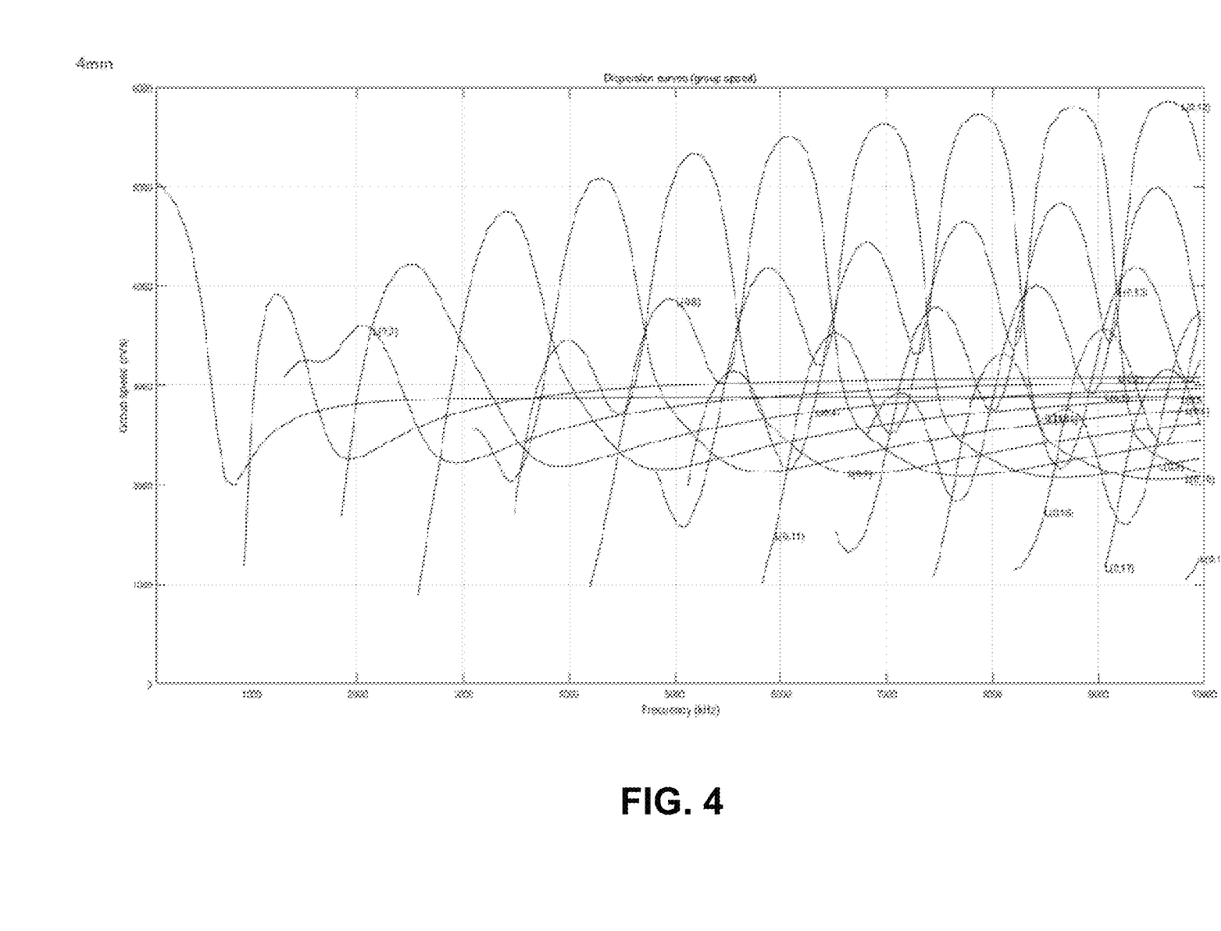
FIG. 4 shows a diagram of ultrasonic group speed versus frequency when the diameter of a right circular cylinder is 4 millimeters, according to one embodiment of the present invention.
Figure 5:
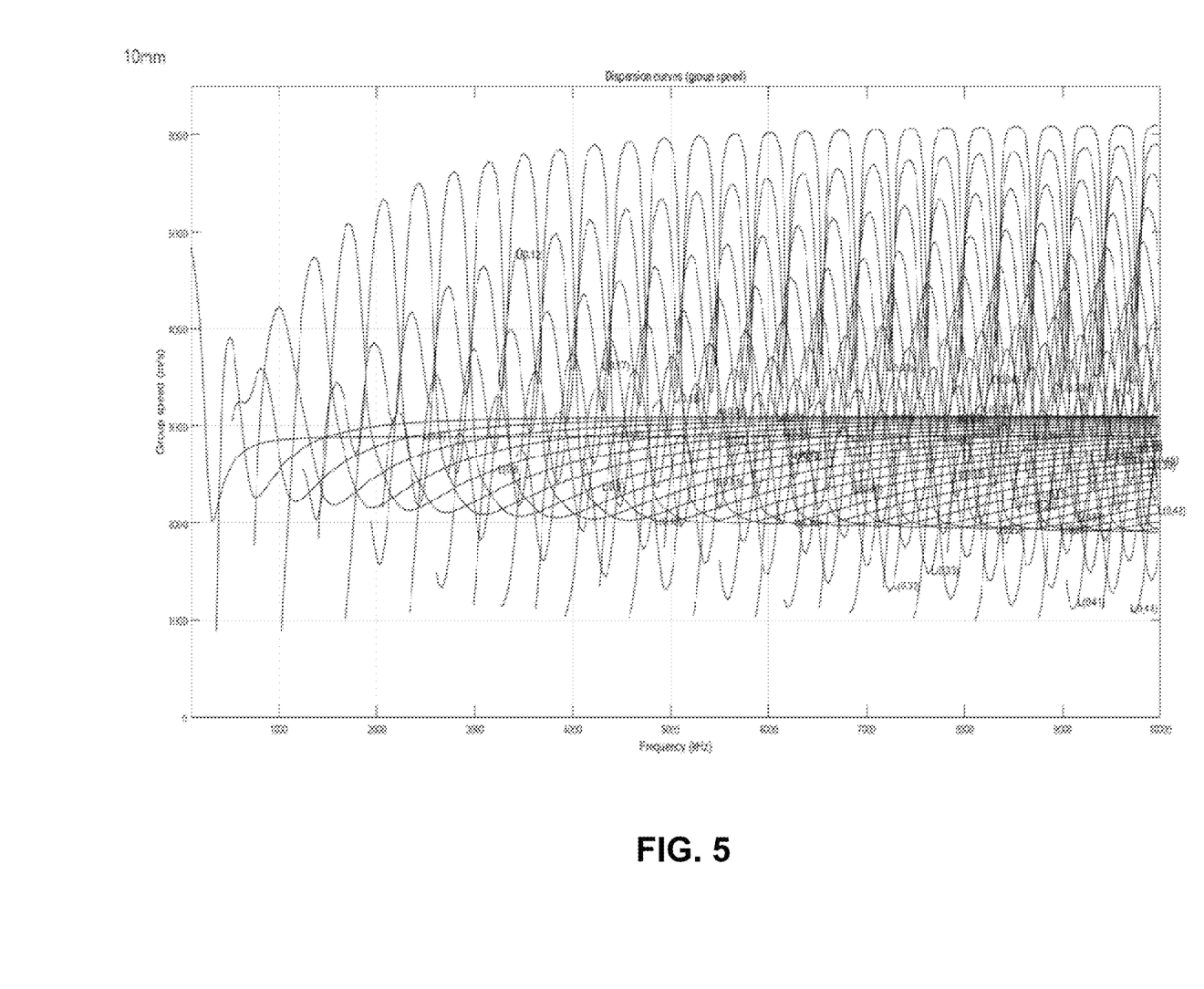
FIG. 5 shows a diagram of ultrasonic group speed versus frequency when the diameter of a right circular cylinder is 10 millimeters, according to one embodiment of the present invention.
Figure 6:
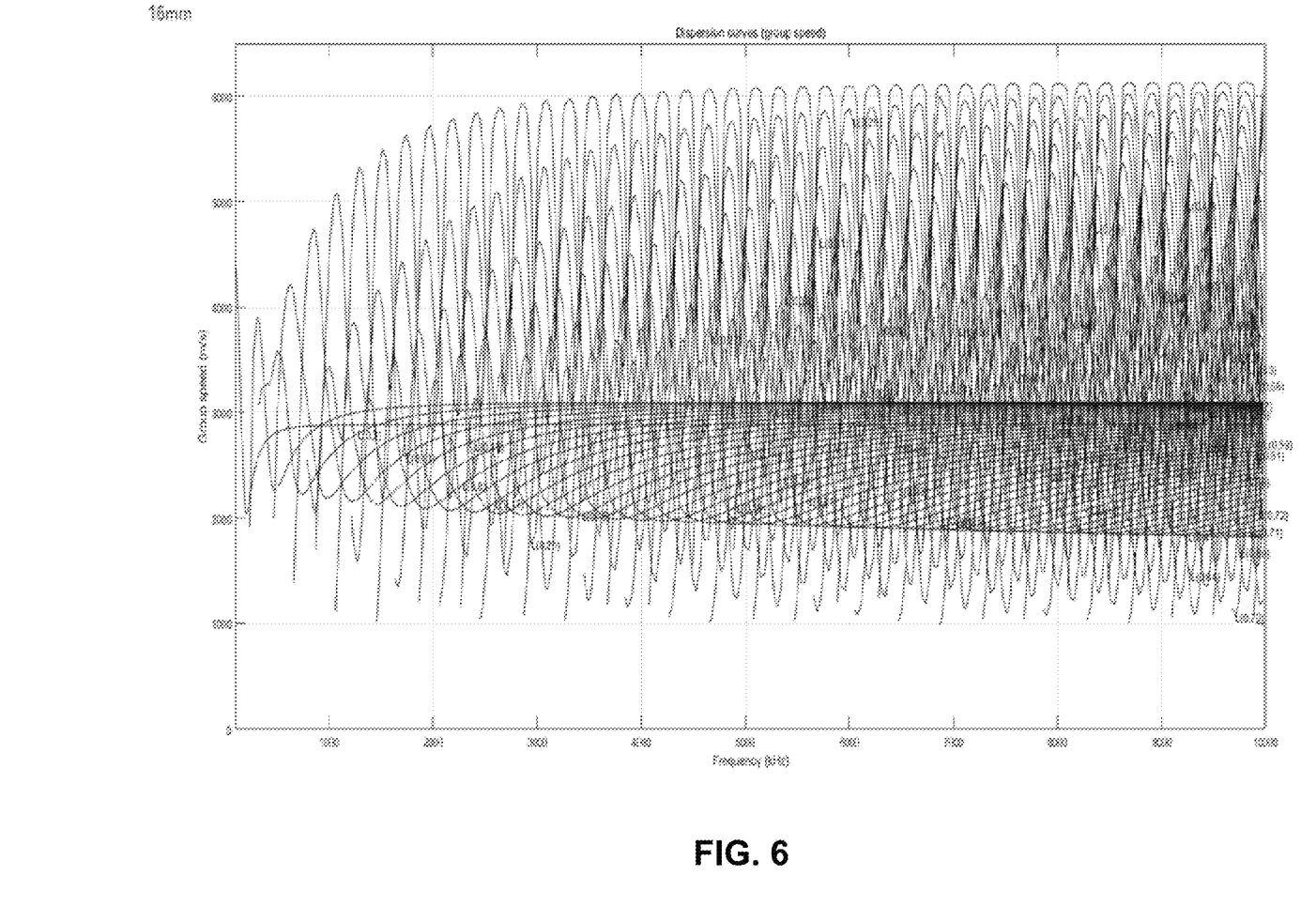
FIG. 6 shows a diagram of ultrasonic group speed versus frequency when the diameter of a right circular cylinder is 16 millimeters, according to one embodiment of the present invention.

FIGS. 4, 5, and 6 show diagrams of ultrasonic group speed versus frequency when the diameter of a right circular cylinder is 4, 10, and 16 millimeters respectively. The results are calculated through finite element simulation. The simulated group velocity dispersion curves reflect complicated situations. However, there are adequate differences between the highest group speed and the second highest group speed. Thus, the signals of the highest and second highest group speeds may be distinguished and the detection results would not be affected by the signals of the second highest group speed. For waveguide diameter of 4 mm, it is clearly identifiable between 1 to 10 MHz for the signals of highest group speed, but not so for the signals of the second highest group speed due to overlapping of waveforms. For waveguide diameter of 16 mm and frequency of 10 MHz, the difference between the highest and second highest group speeds becomes smaller.

Figure 7:
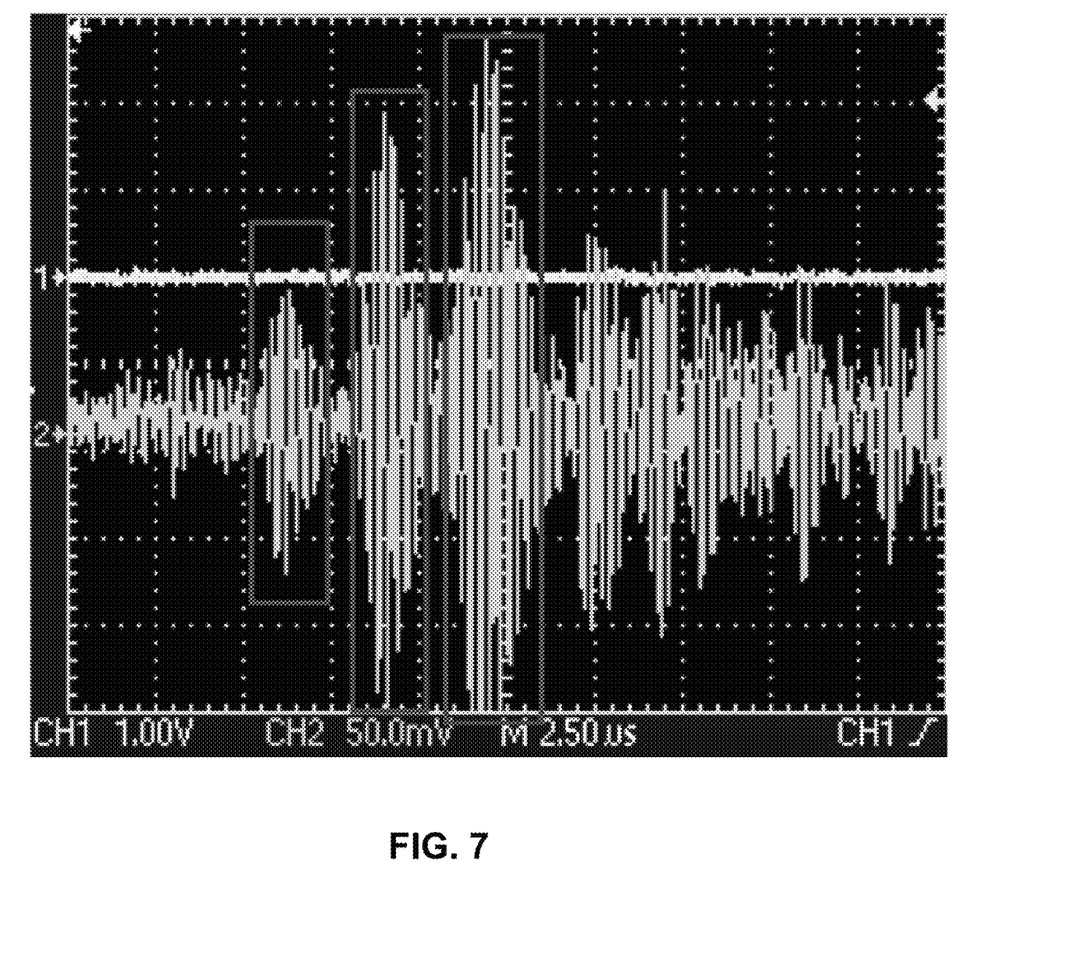
FIG. 7 shows echo signals received using two right circular waveguides which are 300 millimeter-long and 10 millimeters in diameter and the pipe wall thickness is 20 millimeters, according to one embodiment of the present invention.

FIG. 7 displays echo signals at 4 MHz when measuring a pipe with a wall thickness of 20 mm. The two waveguides are right circular cylinders which are 300 millimeter-long and 10 millimeters in diameter. It is seen that the first three arrivals of signals are clearly distinguishable.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. An ultrasonic detection device, comprising:
an ultrasonic transducer;
a first ultrasonic waveguide, the ultrasonic transducer causing generation of a plurality of ultrasonic wave signals which travel along the first ultrasonic waveguide at different speeds, the plurality of ultrasonic wave signals representing a plurality of guided wave modes, the first ultrasonic waveguide transmitting the plurality of ultrasonic wave signals to a wall of an object, wherein the plurality of ultrasonic wave signals travel through the wall of the object and are reflected by an inner surface of the wall;
an ultrasonic sensor; and
a second ultrasonic waveguide, the second ultrasonic waveguide receiving the plurality of ultrasonic wave signals reflected from the inner surface of the wall and transmitting the plurality of ultrasonic wave signals to the ultrasonic sensor, wherein the first and second ultrasonic waveguides are disposed side by side and separated by a predetermined distance, and wherein the first and second ultrasonic waveguides are configured such that the plurality of ultrasonic wave signals include a fastest ultrasonic wave signal and a second fastest ultrasonic wave signal, the fastest ultrasonic wave signal is faster than the second fastest ultrasonic wave signal by a predetermined value to allow stable detection of the fastest ultrasonic wave signal for determining thickness of the wall.

2. The device of claim 1, wherein the first and second ultrasonic waveguides have a length that is selected according to a surface temperature of the object.

3. The device of claim 1, wherein the first and second ultrasonic waveguides include a right circular cylinder, a semicircular cylinder, an oval cylinder, a square column, or a rectangular strip.

4. The device of claim 1 further comprises an isolation plate having predefined dimensions, wherein the first and second ultrasonic waveguides go through the isolation plate, and the isolation plate isolates high or low temperature at the wall from the ultrasonic transducer and the ultrasonic sensor to allow the ultrasonic transducer and the ultrasonic sensor to operate in normal operating temperature.

5. The device of claim 1, wherein the ultrasonic transducer or ultrasonic sensor includes a piezoelectric plate.

6. The device of claim 1 further comprises a measuring unit for processing electric signals received from the ultrasonic sensor to determine the wall's thickness.

7. The device of claim 6, wherein the measuring unit receives commands from a control center for setting parameters and starting detection operation and sends detection results to the control center.

8. The device of claim 1 further comprises at least one temperature sensor for measuring temperature at the wall.

9. The device of claim 1 further comprises means for attaching one end of the first ultrasonic waveguide to an outer surface of the wall and attaching one end of the second ultrasonic waveguide to the outer surface of the wall such that the first and second waveguides are perpendicularly contacting the outer surface of the wall.

10. The device of claim 9, wherein metal sheets are inserted between the outer surface of the wall and the one ends of the first and second ultrasonic waveguides respectively to improve coupling efficiency of ultrasonic waves between the wall and the waveguides, and the metal sheets include a gold sheet, a silver sheet, a copper sheet, or an aluminum sheet.

11. A method for detecting thickness of a wall, comprising:
transmitting a plurality of ultrasonic wave signals excited by an ultrasonic transducer at different speeds along a first ultrasonic waveguide to the wall, the plurality of ultrasonic wave signals representing a plurality of guided wave modes; and
receiving the plurality of ultrasonic wave signals reflected from an inner surface of the wall and transmitting the reflected plurality of ultrasonic wave signals to an ultrasonic sensor along a second ultrasonic waveguide, the first and second ultrasonic waveguides disposed side by side and separated by a predetermined distance, wherein the first and second ultrasonic waveguides are configured such that the plurality of ultrasonic wave signals include a fastest ultrasonic wave signal and a second fastest ultrasonic wave signal, the fastest ultrasonic wave signal is faster than the second fastest ultrasonic wave signal by a predetermined value to allow stable detection of the fastest ultrasonic wave signal for determining the thickness of the wall.

12. The method of claim 11, wherein the first and second ultrasonic waveguides have a length that is selected according to a surface temperature of the wall.

13. The method of claim 11, wherein the first and second ultrasonic waveguides include a right circular cylinder, a semicircular cylinder, an oval cylinder, a square column, or a rectangular strip.

14. The method of claim 11, wherein the ultrasonic transducer or ultrasonic sensor includes a piezoelectric plate.

15. The method of claim 11 further comprising using a measuring unit for processing electric signals received from the ultrasonic sensor to determine the wall's thickness.

16. The method of claim 15, wherein the measuring unit receives commands from a control center for setting parameters and starting detection operation and sends detection results to the control center.

* * * * *